Feb. 29, 1944.   P. SCHNITZER   2,342,700
GUIDE DEVICE
Filed March 29, 1941   2 Sheets-Sheet 1

INVENTOR
Philip Schnitzer

Feb. 29, 1944.   P. SCHNITZER   2,342,700
GUIDE DEVICE
Filed March 29, 1941   2 Sheets-Sheet 2
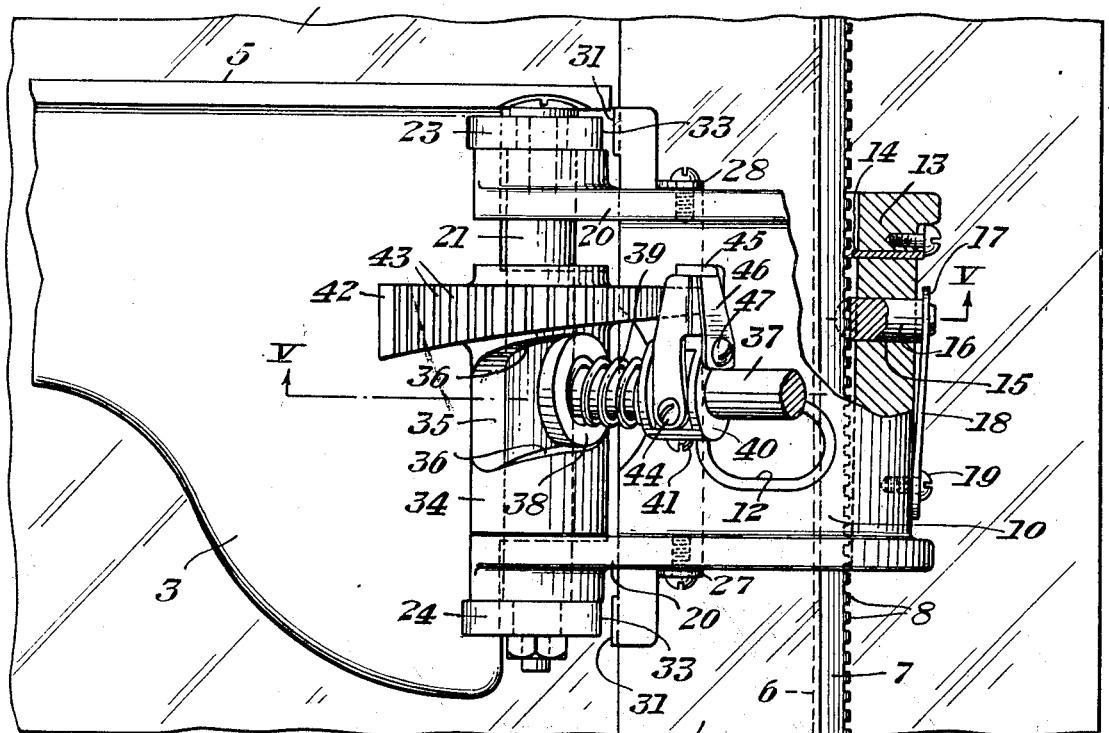
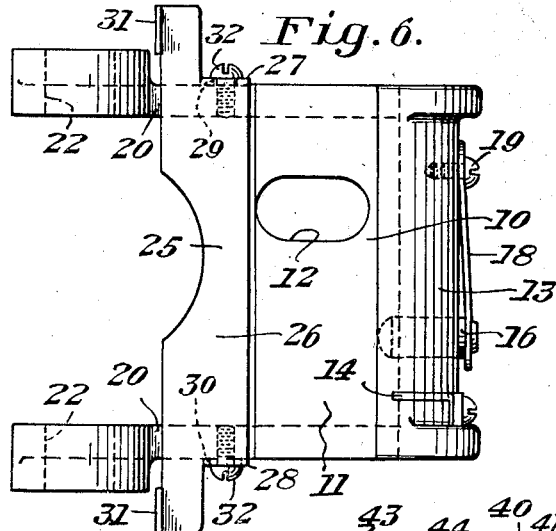
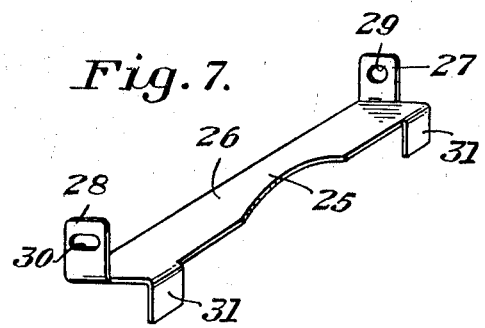
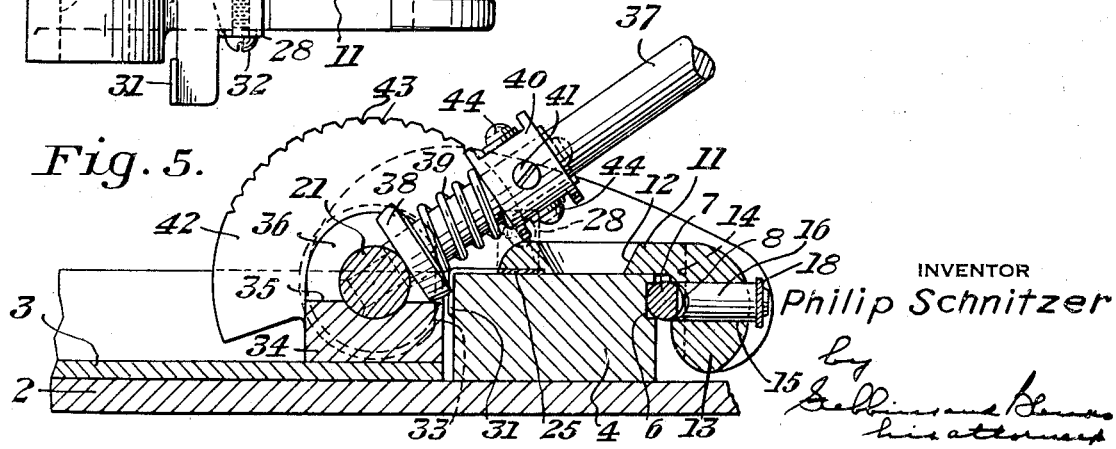
INVENTOR
Philip Schnitzer Patented Feb. 29, 1944

2,342,700

UNITED STATES PATENT OFFICE 2,342,700

GUIDE DEVICE

Philip Schnitzer, Brooklyn, N. Y., assignor to Miller Printing Machinery Co., Pittsburgh, Pa., a corporation of Pennsylvania Application March 29, 1941, Serial No. 385,898

17 Claims. (Cl. 144—253)

This invention relates broadly to guide devices and more particularly to guide devices having an adjustable guide member adapted to be positioned a predetermined distance from another member. The invention further relates to means facilitating adjustably positioning the adjustable guide member and maintaining the same in adjusted position.

While the invention is of broad application and may be employed in many different ways in machines or other devices in which it is desired to position a guide member predeterminedly relatively to another member, the invention is especially applicable in the field of adjustable gauges. An example of an adjustable gauge to which the invention is applicable is the end gauge of a saw trimmer. The end gauge of a saw trimmer must be quickly but accurately positionable predeterminedly relatively to the trimmer. Ordinarily the end gauge is brought into adjusted position by, first, a coarse adjustment and, second, a fine adjustment. The coarse adjustment is ordinarily accomplished by moving the end gauge by hand rather rapidly along the trimmer table to approximately the desired position where it is engaged with a fine or micrometer adjusting means for bringing it accurately to the adjusted position desired. In adjustable end gauges for saw trimmers as heretofore employed various difficulties have been encountered which have not been entirely satisfactorily overcome. For example, the coarse and fine adjustments require successive manipulations of different parts which require shifting of both hands and eyes during adjustment. It is customary to obtain the fine adjustment by a screw or screwlike adjusting device and in most saw trimmers the screw is manipulated from a point remote from the end gauge. In many cases the fine or micrometer adjustment scale is at a point substantially removed from the coarse adjustment scale. In some cases it is necessary to alter the orientation of the end gauge by tilting it relatively to the table in order to adjust it.

I provide a guide device which overcomes all of the disadvantages inherent in devices of the type above referred to as heretofore employed. Purely for the purpose of explanation and illustration I shall describe the invention as embodied in an adjustable end gauge for a saw trimmer, it being understood that this is only one of many different forms which the invention may take. I provide an adjustable end gauge whose fine and coarse adjustments may be made in a substantially continuous movement and without shifting either the hands or the eyes between substantially separated parts. It is not necessary to either manipulate the fine adjustment mechanism or read the fine adjustment scale at a point remote from the end gauge or the coarse adjustment scale. It is not necessary to tilt the end gauge relatively to the table in making any adjustment. Although in the preferred structure presently to be described the orientation of the end gauge is altered slightly in a plane parallel to the plane of the table during adjustment it is not necessary to move the end gauge or any portion thereof out of such plane. Moreover, by slight modification of the structure alteration of the orientation of the end gauge even in such plane may be avoided if this should be desired. This will appear from the detailed description to follow.

Other details, objects and advantages of the invention will become apparent as the following description of a present preferred embodiment thereof proceeds.

In the accompanying drawings I have shown a present preferred embodiment of the invention, in which Figure 1 is a plan view of an adjustable end gauge for a saw trimmer;

Figure 4 is a plan view of the structure shown in Figure 1 but to enlarged scale and with portions cut away and other portions shown in cross section and with the parts in a different operative position than the position shown in Figure 1;

Figure 5 is a vertical cross-sectional view taken on the line V—V of Figure 4;

Figure 6 is an inverted plan view of a portion of the structure; and

Figure 7 is a perspective view of one of the elements.

This application is in part a continuation of my copending application Serial No. 314,637. The structural details of the embodiment of the invention shown herein differ slightly from those of the embodiment shown in my said copending application but the principles employed are throughout substantially the same.

Referring now more particularly to the drawings, there is shown a table 2 which may, for example, be the table of a saw trimmer. The trimmer itself is not shown since it forms per se no part of the present invention. The end gauge of the trimmer is shown at 3 and is adapted to be adjustably positioned accurately relatively to the trimmer. The direction of adjustment of the end gauge 3 is the up and down direction viewing Figure 1.

Figures 2, 3:
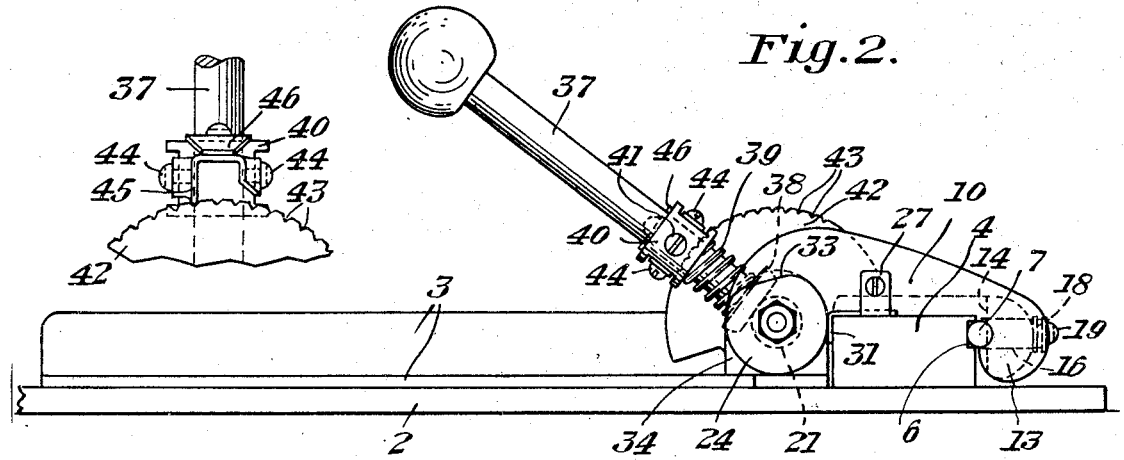
Figure 2 is an elevational view of the structure shown in Figure 1.
Figure 3 is a fragmentary detail elevational view to enlarged scale of a portion of the structure shown in Figure 2 but as viewed from the opposite direction.

Fixed to the table 2 is a straight bar 4 which extends at right angles to the operative face 5 of the end gauge 3 when the end gauge is in an adjusted operative position. The bar 4 has a longitudinal recess 6 milled therein and a round rod 7 lies against the bar and enters the recess 6 to be positioned thereby as best shown in Figures 2 and 5 and is permanently fastened to the bar 4 by screwing, riveting, welding or otherwise fastening it thereto so that the bar 4 and the rod 7 form in effect an elongated straight guiding and positioning unit, as will presently appear. The rod 7 has teeth 8 formed therein and the bar 4 has on its upper surface a scale 9 corresponding to the teeth 8 and whereby the position of the end gauge along the bar 4 and relatively to the trimmer may be roughly determined.

Figure 1:
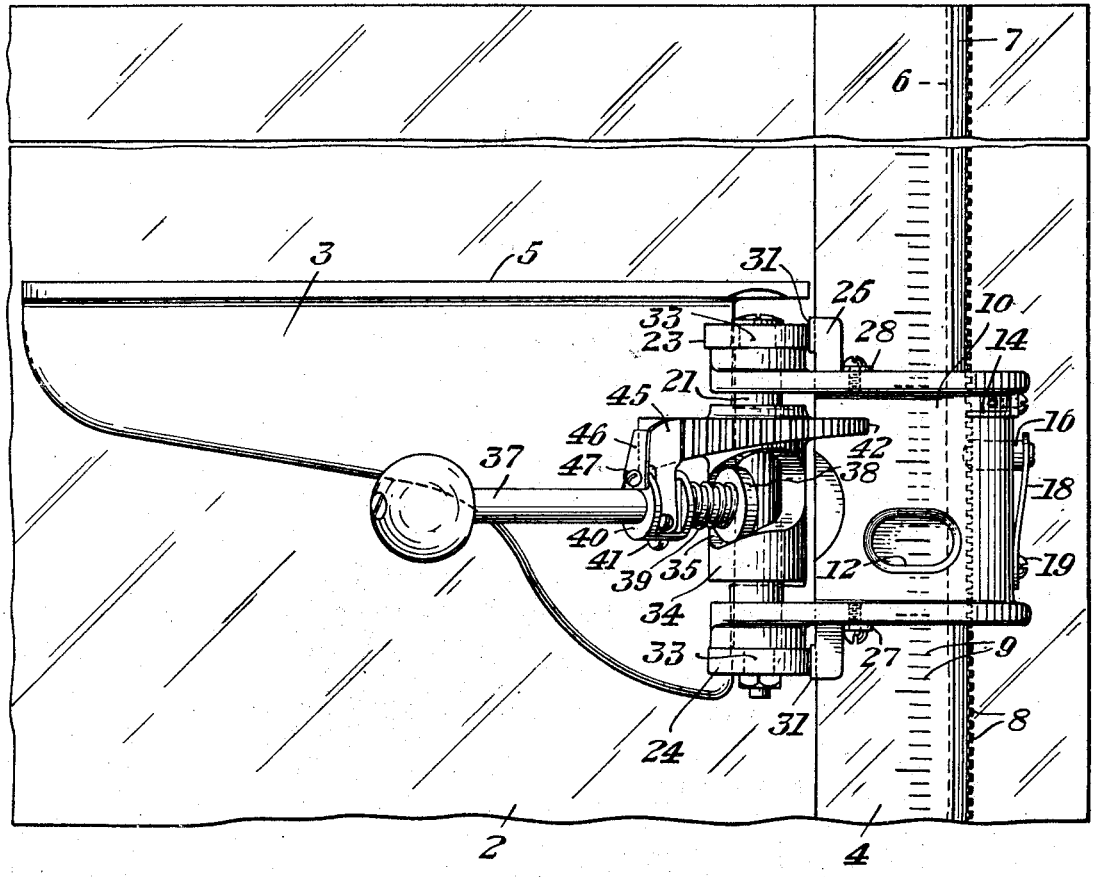

Adapted to ride upon the bar 4 is a slide 10 which is shown in inverted plan view in Figure 6. The slide 10 has a body portion 11 adapted to overlie the bar 4 and having therethrough an opening 12 through which the indices of the scale 9 may be read. One of the edges of the opening 12 may serve as an index on the slide to cooperate with the indices of the scale to determine the position of the slide along the bar. Appropriate figures (not shown) will preferably be applied to the scale 9 in such a position as to be readable through the opening 12. The slide 11 also has a generally downwardly extending hooklike portion 13 adapted to partially embrace the rod 7, as shown in the drawings. The portion 13 carries a detent 14 which projects inwardly beyond the inner surface of the portion 13 and is adapted to interengage with the teeth 8, as shown in Figure 1. The portion 13 also has a bore 15 therethrough within which slides a plunger 16 whose outer end is riveted to the free end 17 of a leaf spring 18 fastened to the outer surface of the portion 13 at 19. The leaf spring urges the plunger 16 toward the left, viewing Figures 1, 2, 4, 5 and 6. The plunger 16 engages the rod 7. Thus the plunger 16 and spring 18 normally tend to move the slide 10 toward the right and to move the detent 14 out of interengaging position relatively to the teeth 8. When the detent 14 is not interengaged with the teeth 8 the slide 10 may be freely moved along the bar 4 to desired adjusted positions. In Figure 4 the slide is shown with the detent out of interengagement relatively to the teeth, in which position the slide is freely movable along the bar 4, while in Figure 1 the detent is shown as being interengaged with the teeth 8, which prevents movement of the slide along the bar.

In addition to having the portions 11 and 13 above described the slide 10 also has a pair of arms 20 projecting toward the left and serving as trunnions for a rotatable shaft 21. The shaft 21 passes through bores 22 in the respective arms 20 and has a cam 23 fastened thereto outside one of the arms and a cam 24 fastened thereto outside the other arm. The cams 23 and 24 which are non-rotatable with respect to the shaft 21 and form in effect integral portions of such shaft (although they may be rotatively adjusted thereon) serve as end thrust members to hold the shaft 21 against endwise movement relatively to the arms 20. Thus the shaft 21 partakes only of rotative movement relatively to the slide 10.

There is provided a bracket member 25 shown in perspective in Figure 7 which is not indispensable and may be omitted if desired but which has certain advantages and is therefore preferably employed. The bracket member 25 has a body portion 26 terminating in a plurality of upturned parallel ears 27 and 28, respectively. The ear 27 has therethrough an opening 29 which is very slightly elongated in the transverse direction viewing Figure 7 and the ear 28 has therethrough an opening 30 which is materially elongated in the transverse direction. The bracket member 25 also has a pair of spaced downwardly extending ears 31 which are coplanar. The bracket member 25 is adapted to be connected with the slide 10 by being positioned therebeneath with the ears 27 and 28 extending upwardly outside the slide. Screws 32 pass through the openings 29 and 30 and enter the slide, as shown in Figure 6. The screws 32 are not tightened up to press the ears 27 and 28 against the slide but are screwed up to a position in which the under surfaces of the screw heads allow clearance for the ears 27 and 28 so that the bracket member 25 may move relatively to the slide 10 to the extent permitted by the slight elongation of the opening 29 and the substantial elongation of the opening 30. The downwardly extending ears 31 of the bracket member 25 are opposed to the hooklike portion 13 of the slide 10 so that when the slide is applied to the bar 4 the bar will lie between the ears 31 and the portion 13. Since the opening 29 in the ear 27 of the bracket member 25 is only slightly elongated while the opening 30 in the ear 28 is materially elongated, the tendency of the spring 18 and plunger 16 is to skew the slide to the angular position shown in Figure 4 in which the detent 14 is not in interengagement with the teeth 8. While I prefer to employ a structure of the type shown, the openings 29 and 30 may be made identical and both elongated sufficiently so that the slide instead of being skewed relatively to the bar may move in and out with substantially rectilinear motion. In either case the motion of the slide must be sufficient to enable the detent 14 to be engaged with and disengaged from the teeth 8.

Movement of the slide to engage the detent 14 with the teeth 8 is effected by the cams 23 and 24. These are both circular cams, each with a flattened face portion. The cams are so oriented on the shaft 21 that the flat face portions thereof lie in substantial parallelism. In one angular or rotative position of the shaft 21 the flat face portions of the cams extend substantially vertically and are positioned toward the right viewing Figure 4. In such figure the flat face portions of the cams 23 and 24 are seen in edge view at the righthand ends of the cams and are designated by reference numeral 33. When the cams are thus positioned clearance is provided between each cam and the opposed ear 31 of the bracket member 25, as shown in Figure 4. Thus when the cams are in the position shown in Figure 4 the spring 18 and plunger 16 move the slide 10 to the position in which the detent 14 is not interengaged with the teeth 8 and in which, consequently, the slide may be moved freely along the bar 4.

When the shaft 21 is turned the flat faces 33 of the cams 23 and 24 move away from their positions opposite the ears 31 of the bracket member 25 as shown in Figure 4, and the relatively projecting circular cam portions move to positions opposite the ears 31. These circular cam portions engage the ears 31 and press thereagainst and, through such ears, against the inside of the bar 4. But since the bracket member 25 floats upon the slide 10 by reason of the elongation of the openings 29 and 30 this pressure of the cams 23 and 24 thereagainst causes the slide to move generally toward the left, viewing Figures 1 and 4, from the position of Figure 4 in which the detent 14 is not interengaged with the teeth 8 to the position of Figure 1 in which it is so engaged. As above indicated, the bracket member 25 is not essential and may be eliminated if desired and the cams 23 and 24 may cooperate directly with the inner face of the bar 4.

The end gauge 3 has a sleeve 34 through which the shaft 21 passes. The sleeve 34 lies between the arms 20 of the slide 10 but the length of the sleeve is materially less than the distance between the inner faces of the arms so that the sleeve may partake of axial movement along the shaft 21 between the arms 20. The sleeve 34 has a cut-out portion 35, best shown in Figures 1 and 4, such portion being bounded by inclined cam surfaces 36 facing toward each other. Connected with the shaft 21 so as to form an integral part thereof and projecting radially outwardly therefrom is a handle 37. The handle 37 passes through the cut-away portion 35 of the sleeve 34. Surrounding the handle 37 and lying between the cam surfaces 36 is a cam follower 38. The transverse dimension of the cam follower 38 between the cam surfaces 36 is such that the follower lies snugly but not bindingly between such surfaces. While the follower 38 may be permanently fixed to the handle 37 it is shown as being resiliently pressed downwardly along the handle toward the shaft 21 by a coil spring 39 bearing against the upper face of the follower 38 and against the lower face of a collar 40 fixed to the handle 37 by a set screw 41.

Integral with the sleeve 34 is a scale 42 which, as will presently appear, is a fine adjustment or micrometer adjustment scale for accurately positioning the end gauge 3. In the form shown the scale 42 comprises a series of notches 43 in the periphery of an enlarged hub-like protrusion forming part of the sleeve 34. It may also have numerals or other indicia applied thereto if desired. Pivoted to the collar 40 at 44 is a finger 45 the end of which is adapted to enter the notches 43 of the scale 42, as shown in Figure 3. The finger 45 is urged downwardly or toward the scale 42 by a leaf spring 46 fastened to the collar at 47.

The operation of the device above described is as follows: The end gauge 3 is moved to adjusted position by moving the slide 10 along the bar 4 to approximately the desired position and then moving the gauge relatively to the slide to accurately adjusted position. Both movements are effected by grasping and moving the handle 37. The handle is moved to the position of Figures 4 and 5, which is the position in which the flat faces 33 of the cams 23 and 24 are opposed to the ears 31 of the bracket member 25 so as to provide clearance between such cams and ears, thereby permitting the spring 18 and the plunger 16 to move the slide 10 generally toward the right from the position of Figure 1 in which the detent 14 is interengaged with the teeth 8 to the position of Figure 4 in which the detent 14 is not interengaged with the teeth 8. In this position the slide 10 is freely slidable along the bar 4. Still holding the handle 37 the operator moves thereby the slide 10 along the bar 4, observing the scale 9 through the opening 12 in the slide until the index of such scale corresponding approximately to the desired adjusted position of the gauge 3 corresponds with the index of the slide. When the slide has been thus moved to approximately the desired adjusted position by the coarse adjustment indicated by the scale 9 the handle 37 is swung toward the left viewing Figures 1, 2, 4 and 5. This movement of the handle turns the cams 23 and 24 so that their relatively projecting circular portions engage the ears 31 and the slide 10 is drawn toward the left to engage the detent 14 with the teeth 8. This engagement will be effected within a comparatively small arc of turning of the shaft 21. During such turning the cam follower 38 rides in a circular portion of the cam groove formed by the opposed cam surfaces 36 so that the sleeve 34 is not moved along the shaft 21. When the detent 14 interengages with the teeth 8 the handle 37 will be at such a position that the finger 45 enters the notch 43 corresponding to the zero reading on the scale 42. If the exact adjustment desired is the same as the coarse adjustment effected by engagement of the detent 14 with the teeth 8 the handle 37 is stopped and the end gauge is accurately adjusted as desired. If, however, it is desired to adjust the end gauge to a position intermediate the positions determined by engagement of the detent 14 with the teeth 8 the operator simply continues the swinging movement of the handle 37 toward the left viewing Figures 1, 2, 4 and 5 beyond the point at which the finger 45 enters the notch 43 corresponding to the beginning of the fine adjustment increment and until the finger 45 enters the notch 43 indicating exactly the adjustment of the end gauge desired. The adjustment determined by the scale 42 is the fine or micrometer adjustment of the end gauge. Such adjustment is caused by movement of the handle 37 toward the left as just explained, which through the follower 38 and the groove defined by the opposed inclined cam surfaces 36 moves the sleeve 34 and the end gauge 3 carried thereby upwardly viewing Figures 1 and 4 to the desired extent.

The coarse adjustment scale is read through the opening 12 in the slide 10 and the fine adjustment scale 42 is read according to the position of the finger 45 thereon. The two scales are always close together so that they can be read substantially simultaneously without refocusing the eyes. Also it is unnecessary to operate different devices for effecting the coarse and fine adjustments of the gauge. The only operating member which need be employed is the handle 37 and by proper manipulation of this handle the slide is rendered free for movement along the bar 4, the slide is moved along the bar, the slide is fixed to the bar by interengagement of the detent 14 and the teeth 8 and the fine adjustment of the guide relative to the bar is accomplished. Only two movements are involved in the entire setting of the gauge, including both the coarse adjustment and the fine adjustment. The first movement is that of pushing the slide along the bar, which is done by holding the handle 37. The second movement is that of moving the handle 37 to the left, which locks the slide to the bar and moves the guide relatively to the slide to obtain the fine adjustment. The movement for locking the slide to the bar and obtaining fine adjustment of the guide is a single continuous unidirectional movement. Indeed the whole movement of the handle from beginning to end is in the nature of a single movement changing in direction during its course. Thus not only is there no need of refocusing the eyes during the adjustment, but there is no need of reaching to different positions with the hands to effect the coarse and fine adjustments of the guide. Indeed the hands in making the adjustments are conveniently before the eyes and the eyes are at the same time conveniently focused upon both the coarse adjustment scale and the fine adjustment scale simultaneously. This makes for speed and efficiency in adjustment and setting of the gauge which was quite impossible with the structures heretofore employed.

While I have shown and described a present preferred embodiment of the invention it is to be distinctly understood that the invention is not limited thereto but may be otherwise variously embodied within the scope of the following claims.

I claim:

1. A guide device comprising a base, a slide movable along the base, means for fastening the slide to the base, a guide member, a connection between the guide member and the slide comprising means connected with one thereof extending generally parallel to the direction of movement of the slide along the base and having fixed orientation relatively to the guide member and means connected with the other thereof slidable along said first mentioned means and means operable when the slide is fastened to the base for sliding the guide member relatively to the slide along said connection.

2. A guide device comprising a base, a slide movable along the base, means for fastening the slide to the base, a guide member and a connection between the guide member and slide including a member rotatable about an axis having fixed orientation relatively to the guide member and means operable when the slide is fastened to the base causing relative movement between the guide member and slide generally parallel to the direction of movement of the slide along the base upon rotation of said rotatable member.

3. A guide device comprising a base, a slide movable along the base, means including turnable cam means operable in one position to hold the slide in fixed position relatively to the base, a guide member connected with the slide and means for simultaneously turning the cam means and moving the guide means relatively to the slide in a direction generally parallel to the direction of movement of the slide along the base.

4. A guide device comprising a base, a slide movable along the base, means including cam means for fastening the slide to the base, a guide member movable along the slide and having fixed orientation relatively to the slide and means including cam means for moving the guide member along the slide.

5. A guide device comprising a base, a slide movable along the base, means including cam means for fastening the slide to the base, a guide member movable along the slide and having fixed orientation relatively to the slide, means including cam means separate from the first mentioned cam means for moving the guide member along the slide and common operating means for said respective cam means.

6. A guide device comprising a base, a slide movable along the base, a guide member movable along the slide, a rotatable connecting member connecting the guide member and slide and means operated by said connecting member upon rotation thereof for fastening the slide to the base and moving the guide member along the slide.

7. A guide device comprising a base, a slide movable along the base, a guide member carried by the slide, fastening means for fastening the slide to the base against movement in either direction, an operating member connected with both the slide and the guide member and means operated by the operating member in a single continuous movement of the operating member successively rendering operative the fastening means to fasten the slide to the base against movement in either direction and moving the guide member relatively to the slide along the base.

8. A guide device comprising a base, a guide member, a connection between the guide member and base, said connection including means for gripping the base, said connection also including a rotatable shaft, means for rotating said shaft and cam means operatively connected with said shaft to be operated upon rotation of said shaft, said cam means also being operatively connected with the guide member to move the guide member relatively to the base generally axially of said shaft upon operation of the cam means when said gripping means is operative.

9. A guide device for positioning selectively in desired accurately determined adjusted positions work to be acted upon, comprising a base, a guide member connected with the base to be freely travelable therealong for coarse adjustments, means connected with the guide member for gripping the base and means operable when said gripping means is operative for moving the guide member along the base for fine adjustments, said last mentioned means comprising a shiftable operating member travelable along the base with the guide member, means connected with said operating member operable upon shifting of said operating member for finely adjusting the guide member and connections between said operating member and the guide member through which said operating member is shiftable throughout the entire range of its movement in which it finely adjusts the guide member by a single continuous manipulation.

10. A guide device for positioning selectively in desired accurately determined adjusted positions work to be acted upon, comprising a base, a guide member connected with the base to be freely travelable therealong for coarse adjustments, means connected with the guide member for gripping the base and means operable when said gripping means is operative for moving the guide member along the base for fine adjustments, said last mentioned means comprising a shiftable operating member travelable along the base with the guide member, means connected with said operating member operable upon shifting of said operating member for finely adjusting the guide member and connections between said operating member and the guide member through which said operating member is shiftable transversely of the direction of travel throughout the entire range of its movement in which it finely adjusts the guide member by a single continuous manipulation.

11. A guide device for positioning selectively in desired accurately determined adjusted positions work to be acted upon, comprising a base, a slide movable along the base, a guide member carried by the slide, means operative when the slide is in one angular position relatively to the base and inoperative when the slide is in another angular position relatively to the base for fastening the slide against movement in either direction along the base and means for moving the guide member relatively to the slide along the base when the slide is fastened to the base.

12. A guide device for positioning selectively in desired accurately determined adjusted positions work to be acted upon, comprising a base, a slide movable along the base, means for fastening the slide to the base, a guide member carried by the slide and means operable when the slide is fastened to the base for moving the guide member relatively to the slide along the base, said last mentioned means comprising a cam, a manually shiftable operating member engaging the cam to move through the cam the guide member relatively to the slide, and connections through which said operating member is shiftable throughout the entire range of its movement in which it moves the guide member relatively to the slide by a single continuous manipulation.

13. A guide device for positioning selectively in desired accurately determined adjusted positions work to be acted upon, comprising a base, a guide member connected with the base to be freely movable therealong for coarse adjustments, means for moving the guide member along the base for fine adjustments and a fine adjustment scale adjacent the guide member and movable along the base with the guide member.

14. A guide device for positioning selectively in desired accurately determined adjusted positions work to be acted upon, comprising a base, a slide connected with the base to be movable therealong, a guide member carried by the slide, an operating member and connections through which said operating member is shiftable to successively lock the slide to the base and move the guide member along the slide, said operating member being shiftable throughout the entire range of its movement in which it locks the slide to the base and moves the guide member along the slide by a single continuous manipulation.

15. A guide device for positioning selectively in desired accurately determined adjusted positions work to be acted upon, comprising a base, a slide connected with the base to be movable therealong for coarse adjustments, a coarse adjustment index indicating the position of the slide relatively to the base, a guide member connected with the slide to be movable therealong for fine adjustments and a fine adjustment index adjacent the guide member and movable along the base with the guide member indicating the position of the guide member relatively to the slide, said indices being at all times, regardless of the position of the slide relatively to the base or the position of the guide member relatively to the slide, in sufficiently close proximity to be seen substantially simultaneously.

16. A guide device for positioning selectively in desired accurately determined adjusted positions work to be acted upon, comprising a base having a series of portions for positioning a slide, a slide connected with the base and having a portion for cooperation selectively with the respective portions of said series for positioning it, a guide member carried by the slide and movable to desired accurately determined adjusted positions with respect thereto, resilient means normally maintaining the slide in a position in which it is freely slidable relatively to the base and means for moving the slide against the action of said resilient means to a position in which said portion of the slide cooperates with one of said series of portions to position the slide relatively to the base.

17. A guide device comprising a base, a guide member having an adjustable connection with the base whereby it may assume a plurality of angular positions relatively to the base in one of which it is movable along the base and in another of which it is fixed relatively to the base and means acting between the guide member and base to move the guide member to and maintain the same in said second mentioned angular position relatively to the base.

PHILIP SCHNITZER.